United States Patent
Han et al.

(10) Patent No.: US 7,356,684 B2
(45) Date of Patent: Apr. 8, 2008

(54) BOOTING SYSTEM AND/OR METHOD FOR INITIALIZING PERIPHERALS

(75) Inventors: Kyu-in Han, Suwon-si (KR); Kyung-young Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 383 days.

(21) Appl. No.: 11/100,632

(22) Filed: Apr. 7, 2005

(65) Prior Publication Data
US 2005/0268081 A1 Dec. 1, 2005

(30) Foreign Application Priority Data
Apr. 7, 2004 (KR) .............. 10-2004-0023773

(51) Int. Cl.
*G06F 15/177* (2006.01)
*G06F 3/00* (2006.01)
(52) U.S. Cl. .............. 713/2; 713/1; 710/10
(58) Field of Classification Search .......... 713/1, 713/2; 709/222; 710/10
See application file for complete search history.

(56) References Cited

U.S. PATENT DOCUMENTS 5,379,431 A * 1/1995 Lemon et al. .......... 710/10
6,158,000 A 12/2000 Collins
6,546,489 B1 * 4/2003 Frank et al. .......... 713/187
6,691,160 B1 * 2/2004 Bradley .......... 709/222

FOREIGN PATENT DOCUMENTS

| JP | 1-154226 | 6/1989 |
|---|---|---|
| JP | 11-143718 | 5/1999 |
| JP | 2000-353359 | 12/2000 |
| KR | 2000-0019147 | 4/2000 |
| KR | 2000-0039273 | 7/2000 |

* cited by examiner

*Primary Examiner*—Suresh K Suryawanshi
(74) *Attorney, Agent, or Firm*—Staas & Halsey LLP

(57) ABSTRACT

A booting system, method, and/or medium initializing peripherals of a computer system. The booting system initializing peripherals includes an auxiliary memory device including execution codes of an embedded OS in a predetermined area thereof, a CPU for extracting and executing the codes, and a plurality of peripherals that can self-initialize in parallel in response to an instruction received from the embedded OS run by executing the codes.

22 Claims, 5 Drawing Sheets

BOOTING SYSTEM AND/OR METHOD FOR INITIALIZING PERIPHERALS

CROSS-REFERENCE TO RELATED APPLICATION

This application claims benefit from Korean Patent Application No. 10-2004-0023773 filed on Apr. 7, 2004 in the Korean Intellectual Property Office, the disclosure of which is incorporated herein by reference in its entirety.

BACKGROUND OF THE INVENTION

1. Field of the Invention

Embodiments of the present invention relate to booting systems, methods, and media for initializing peripherals, and more particularly, to a booting system, method, and media for initializing peripherals coupled to a computer system before the computer system calls an operating system.

2. Description of the Related Art

Generally, when a computer system running a predetermined operating system (OS) is turned on, a diagnostic testing sequence is performed to determine if various peripherals coupled to the computer are properly working before calling an operating system (OS). This is commonly referred as a Power-On Self-Test (POST) operation.

For example, if a personal computer (PC) is powered on, a basic input/output system (BIOS) will perform the POST operation to check a keyboard, random access memories (RAMs), disk drives, peripheral devices and other hardware components to ensure that the PC is properly functioning. The BIOS is a kind of program stored in a read only memory (ROM) mounted on a main-board of a PC and performs an initial boot-up stage before an OS, e.g., windows 9x, windows me, windows 2000 and windows XP, is loaded. During the POST operation, when essential hardware components are detected and found to be operating properly, the PC begins to boot by calling its OS. On the other hand, when essential hardware components are not detected or found to be operating improperly, the BIOS issues an error message in the form of, for example, a visual text on a display screen or a series of audible beeps. Since the checking of the hardware is an absolutely essential step for the PC to function, any error found in the POST will usually be fatal, causing the boot process to halt. As described above, the BIOS operation is quite an important process for the initialization of a PC. However, as computer systems become more complicated and bulky, it is necessary to upgrade the BIOS to reflect complicated and diverse system characteristics. As the BIOS is upgraded, ROM storing the BIOS becomes larger. In addition, since the POST based on the BIOS is performed in sequential steps, loading of the system OS may be delayed. Further, a program for executing the POST takes up additional hardware resources in the PC. Also, in the case of the "Windows" operating system, since it has its own sequence to initialize and set drivers of hardware components coupled to the PC without using codes programmed in the BIOS, the POST performed by the BIOS is inefficient and potentially redundant. Accordingly, a POST mechanism enabling a computer system to boot efficiently and quickly is required.

SUMMARY OF THE INVENTION

To solve the above-described problems, an aspect of the present invention is to provide a booting system, method, and medium for initializing peripherals, which can perform a POST in parallel for a plurality of peripherals by allocating a predetermined area of an auxiliary memory device to install an embedded OS having the POST instructions therein.

In accordance with an aspect of the present invention, there is provided a booting system for initializing peripherals, including an auxiliary memory device containing in a certain area thereof codes to execute an embedded OS, a CPU for extracting and executing the codes, and a plurality of peripherals to be initialized in parallel by the embedded OS run by executing the codes.

Here, the auxiliary memory device may be a hard disc.

In addition, the predetermined area includes a non-volatile memory. The non-volatile memory may be a flash memory.

In another aspect of the present invention, there is provided a booting method for initializing peripherals, including extracting codes to execute an embedded OS stored in a predetermined area of an auxiliary memory device by a CPU, executing the extracted codes, and initializing a plurality of peripherals in parallel by the embedded OS executed by the extracted codes.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
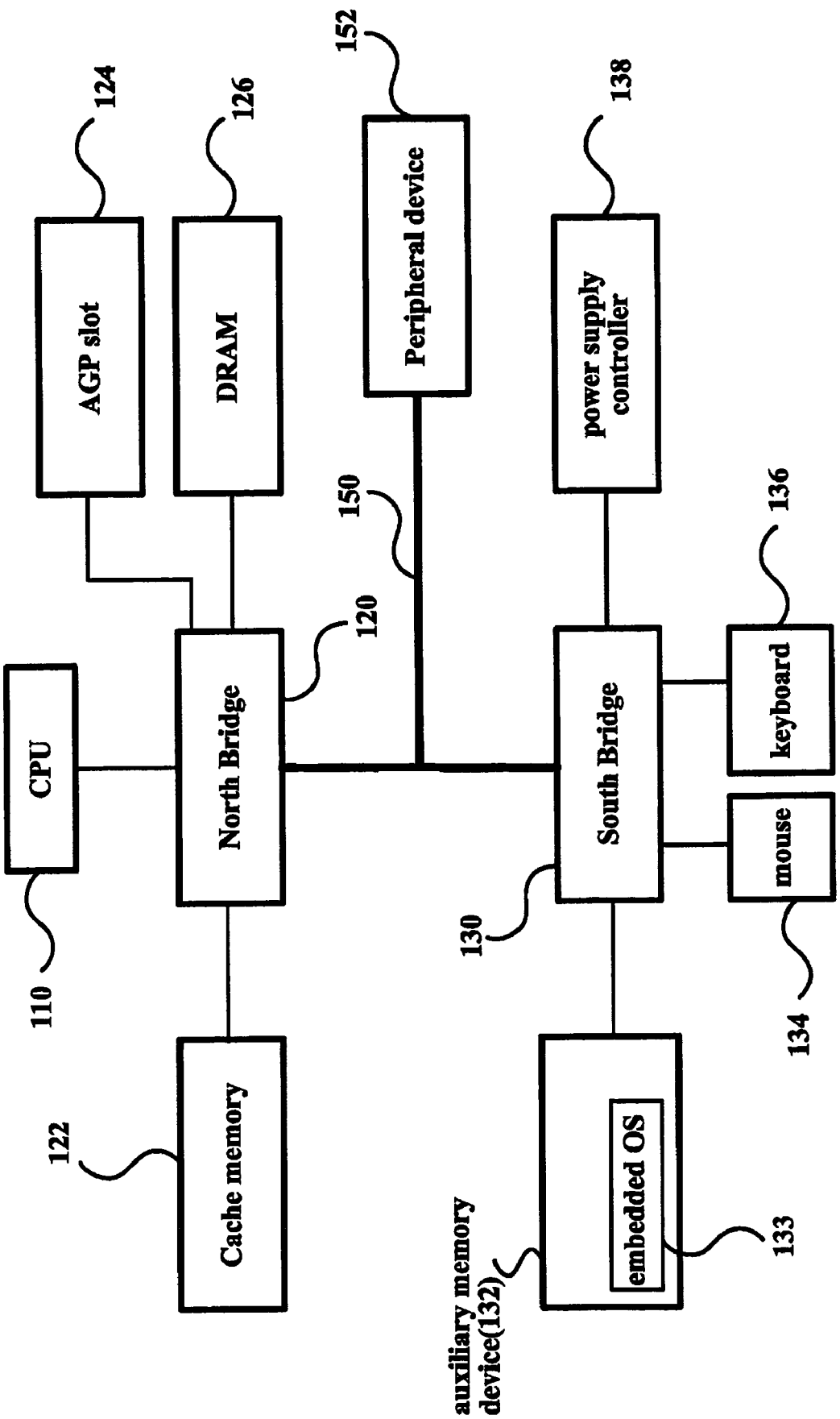
FIG. 1 is a block diagram of a computer system explaining a booting system, in accordance with an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

The present invention may be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

Now, a booting system, method, and medium for initializing peripherals coupled to a computer system according to an embodiments of the present invention will be described in detail with reference to the accompanied drawings, block diagrams and flow charts.

FIG. 1 illustrates a block diagram of a computer system for explaining a booting system, in accordance with an embodiment of the present invention. Referring to FIG. 1, a computer system includes a central processing unit (CPU) 110, a north bridge 120, and a south bridge 130. The north bridge 120 coupled to the CPU 110 is a hardware or a software module connected to system elements and peripherals which require high performance and transmission speed, and the south bridge 130 is a hardware or a software module connected to system elements and peripherals which require relatively low performance and transmission speed.

The north bridge 120 coupled to the CPU 110 may be connected to cache memories 122, dynamic random access memory (DRAM) modules 126, and accelerated graphics port (AGP) slots.

The south bridge 130 may be connected to an auxiliary memory device 132 such as a hard disc, a mouse 134, a keyboard 136 and a power supply controller 138.

A peripheral device bus 150 is an interface for connecting peripheral device 152 to a computer system and the north bridge 120 to the south bridge 130. For example, the peripheral device bus 150 may be a peripheral component interface (PCI) and the peripheral device 152 may be input/output devices, FDD, micro-computer, etc.

In a conventional booting system, a BIOS ROM is coupled to a south bridge, and, when the computer system power is turned on, a CPU fetches BIOS codes from the BIOS ROM in a POST sequence, loads them into a DRAM and then executes the BIOS codes.

However, a booting system in accordance with an embodiment of the present invention does not include a BIOS ROM with a POST but includes the auxiliary memory medium 132 such as a hard disc, which allocates a predetermined area as an area of an embedded OS which runs the POST. The embedded OS area allocated in the hard disc is logically or physically separated. The embedded OS area is physically separated by using a non-volatile memory in the existing auxiliary memory device or connecting a non-volatile memory to the existing auxiliary memory device. A hard disc may be used as the auxiliary memory device. Further, in addition to other media such as magnetic storage media (ROMs, RAMs, floppy disks, magnetic tapes, etc.), optically readable media (CD-ROMs, DVDs, etc.), and carrier waves (e.g., transmission over the Internet), a flash ROM may also be used as the non-volatile memory to be connected to the auxiliary memory device.

When a computer system is turned on, the CPU 110 loads the embedded OS stored in the auxiliary memory device into the DRAM 126 via a predetermined interface that enables the CPU 110 to communicate with a memory device such as the auxiliary memory device coupled to the south bridge 130. For example, if the auxiliary memory device is a hard disc, the interface may be an integrated device electronics (IDE) interface.

Figure 2:
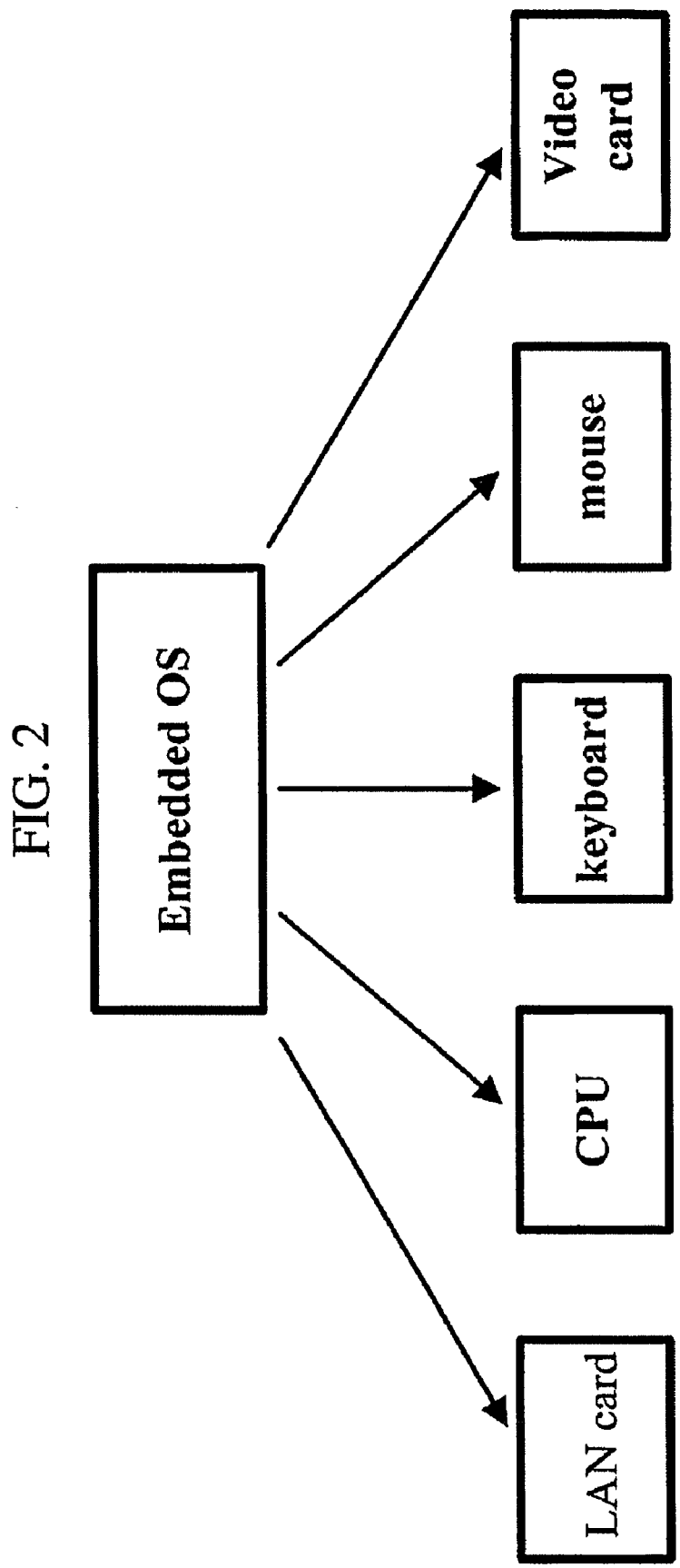
FIG. 2 is a schematic diagram showing a method for initializing and testing peripherals in parallel by an embedded OS, in accordance with an embodiment of the present invention.

Then, the loaded embedded OS performs diagnostic testing and initialization of peripherals coupled to the computer system and system elements. Here, since the embedded OS has a multi-tasking function, the initialization and the diagnostic testing for a plurality of peripherals are performed at the same time. FIG. 2 schematically illustrates that the embedded OS performing such an initialization and diagnostic testing of the peripherals in parallel. During the initialization and diagnostic testing, the embedded OS can use peripheral drivers. That is, the embedded OS does not initialize peripherals using its own codes but initializes peripherals by external device drivers that are used by a system OS. Accordingly, it is not necessary for the system OS to additionally perform initialization and diagnostic testing of the peripherals. However, if there is no device driver, the embedded OS may have fundamental device drivers to start the device.

After diagnostic testing and initialization are properly finished, the embedded OS empowers a system operating system (system OS) to control the computer system and the system OS is called.

Meanwhile, the computer can run based on architecture with two independent channels instead of a bridge structure with the north bridge 120 and the south bridge 130, which is illustrated with reference to FIG. 3.

Figure 3:
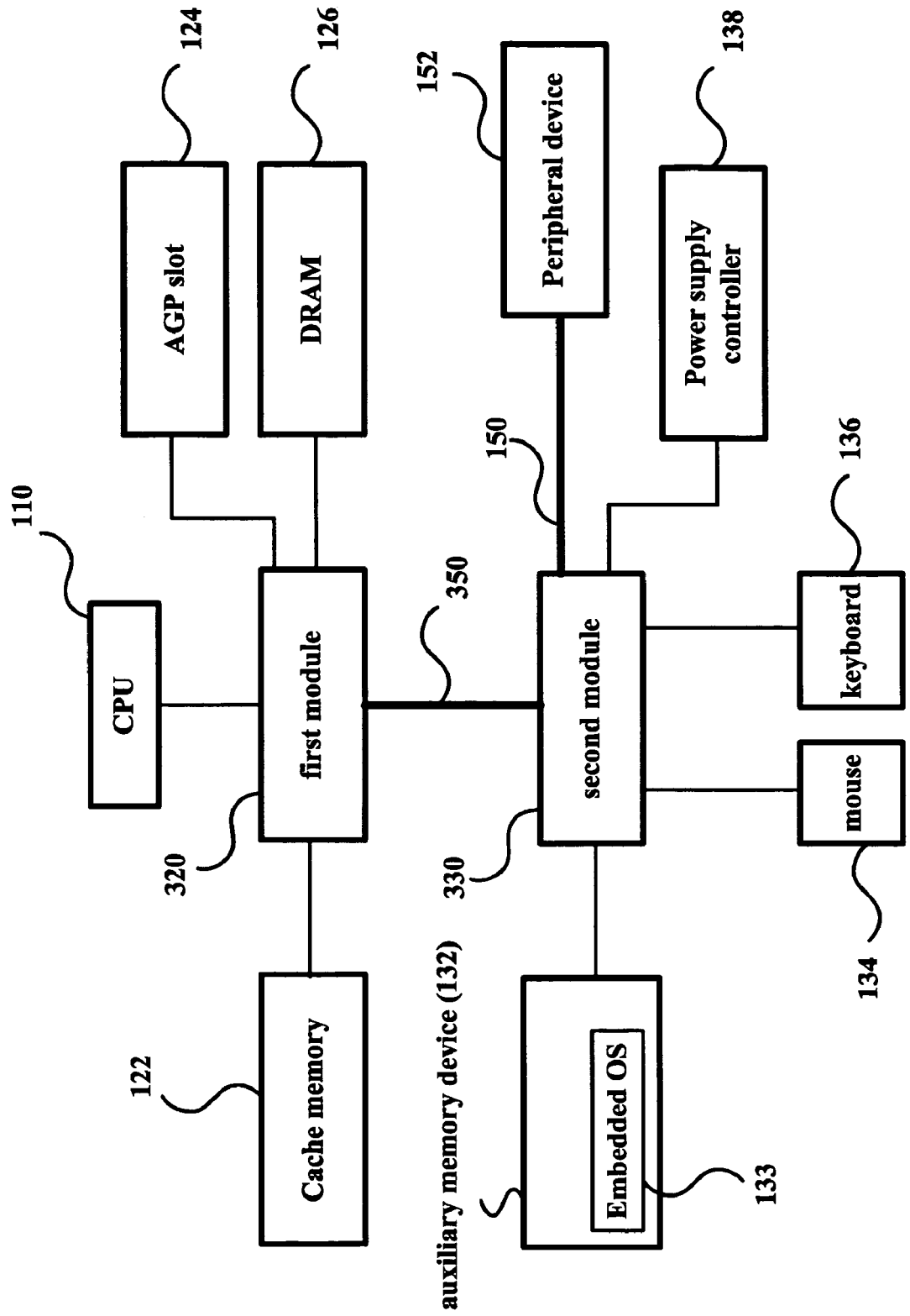
FIG. 3 is a block diagram of a computer system explaining a booting system, in accordance with another embodiment of the present invention.

As shown in FIG. 3, an interface channel 350 is provided between a first module 320 corresponding to the north bridge 120 and a second module 330 corresponding to the south bridge 130 for high speed data transmission. And the peripheral device bus 150 is an interface for connecting peripheral device 152 to the second module 330. The peripheral device 152 may be input/output devices, FDD, micro-computer, etc.

Figure 4:
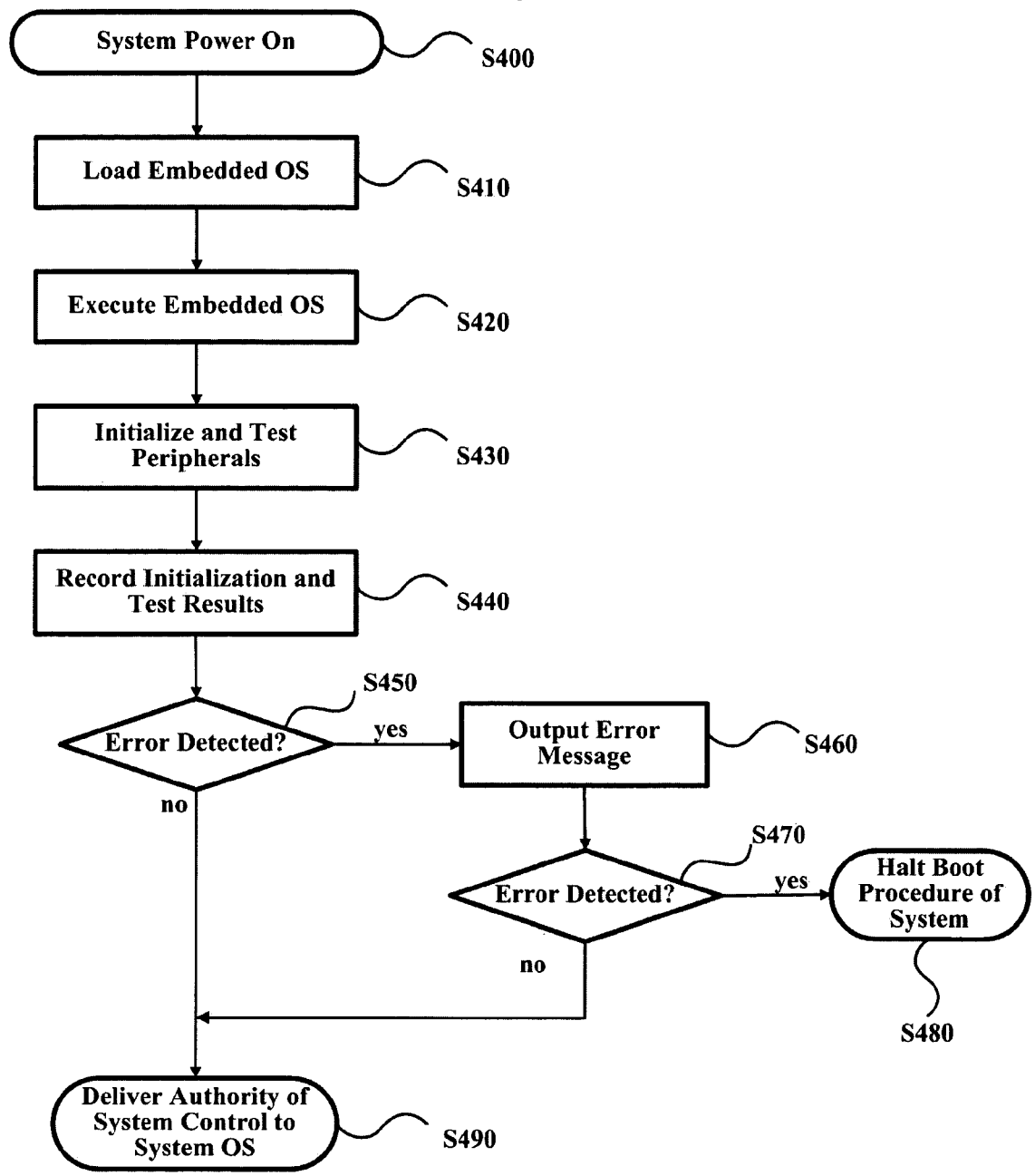
FIG. 4 is a flow chart showing POST sequence, in accordance with an embodiment of the present invention.

FIG. 4 illustrates a flow chart showing a POST sequence according to an embodiment of the present invention.

As a user turns on a computer system, the POST is performed in operation S400 before a system OS runs.

In other words, the CPU 110 loads the embedded OS codes stored in the auxiliary memory device 132 into a main memory device such as DRAM 124 in operation S410 and the embedded OS starts up in operation S420. Here, the embedded OS codes include codes to initialize peripherals and to read what it is stored in the auxiliary memory device 132.

Next, the embedded OS initializes and tests the peripherals using device drivers stored in the auxiliary memory device 132 in operation S430. Here, the initializing and testing are not sequentially performed for the peripherals but performed in parallel by a multi-tasking function which is a basic function of an OS. After the initializing and testing is finished, in operation S440, the embedded OS records information with respect to initializing and testing results in an additional data structure which may be a table structure.

If it is determined that all the peripherals are detected, initialized and working properly, the embedded OS hands over system control to a system OS in operations S450 and S490.

However, if any of the peripherals are not detected or found to be working improperly, an error message is output in operations S450 and S460. Here, the error message may be a visual text on a display screen or a series of audible beeps.

Some POST errors are considered "fatal" while others are not. If the error is considered "fatal," the boot process will be halted (operations S470, and S480). However, if the error is not fatal, the embedded OS allows a user to choose whether to halt the boot process or to call the system OS to continue the boot process.

Figure 5:
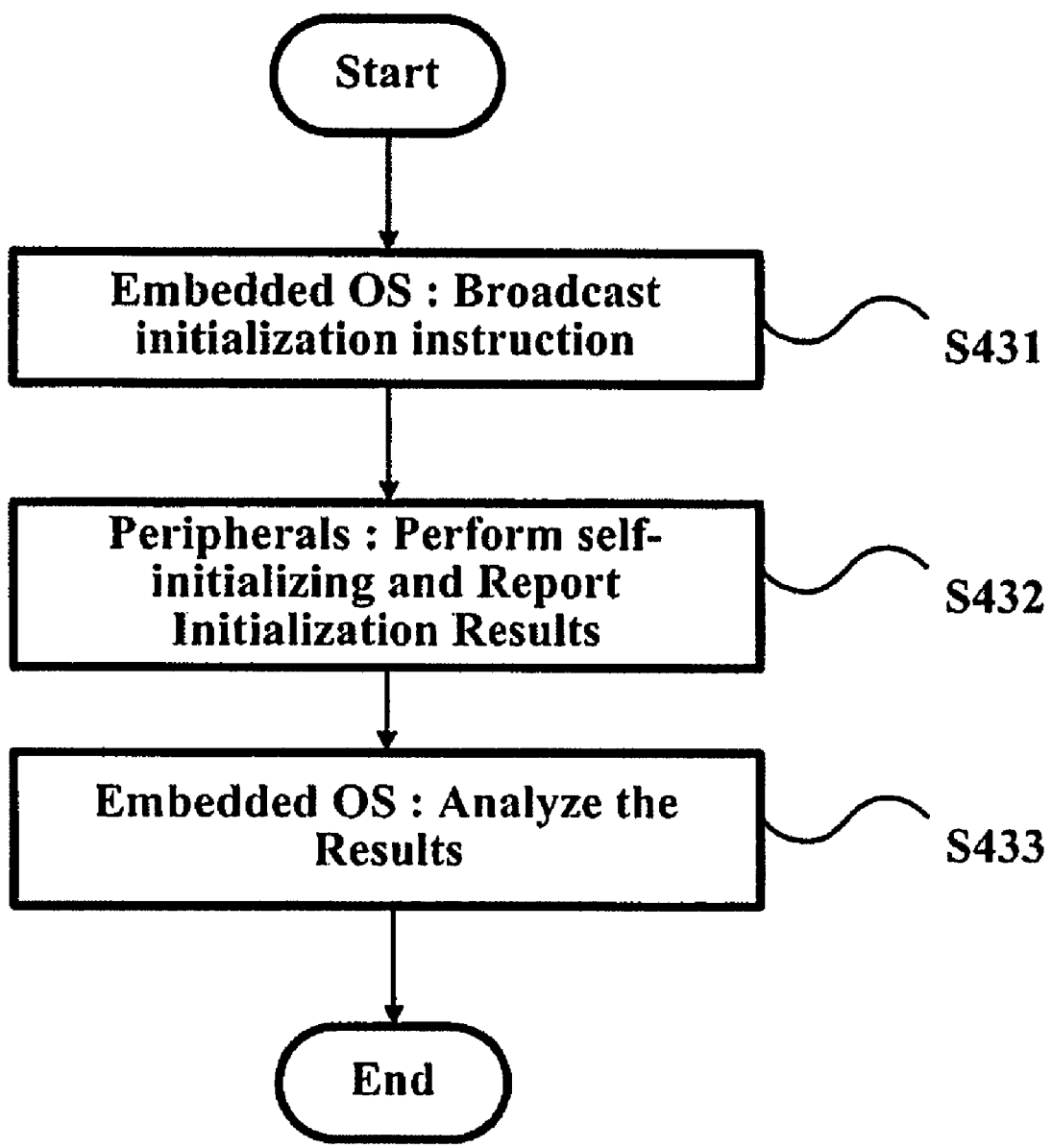
FIG. 5 is a flow chart showing a method for initializing and testing peripherals, in accordance with an embodiment of the present invention.

FIG. 5 is a flow chart showing a method for initializing and testing peripherals in accordance with an embodiment of the present invention, specifically illustrating operation S430 shown in FIG. 4.

As shown in FIG. 5, after the embedded OS starts to run, the embedded OS broadcasts initialization instructions to all the peripherals in operation S431. After receiving the initialization instruction, the peripherals perform self-initializing and testing using their own initialization programs, and deliver information containing the initializing and testing results to the embedded OS in operation S432.

The initializing and testing result may be return value which represents initial state The information transmitted to the embedded OS further includes identification codes of the respective peripherals so that the embedded OS can identify the peripherals corresponding to the transmitted information.

Then, the embedded OS analyzes the information, determines if the corresponding peripheral is detected and properly initialized based on the transmitted information in operation S433, and records the analyzing results in an additional data structure. See operation S440 shown in FIG. 4.

On the other hand, when a device driver is updated, like in a case in which a sound card driver is updated, the updated driver is installed in the auxiliary memory such as the hard disc. The embedded OS will not have an image of the device driver but can initialize and test the sound card using the installed sound card driver. Accordingly, the embedded OS is not modified even if the computer system is changed.

It will be understood by those of ordinary skill in the art that various changes in form and details may be made therein without departing from the spirit and scope of the present invention as defined by the following claims. Therefore, it is to be appreciated that the above described embodiments are for purposes of illustration only and not to be construed as a limitation of the invention. The scope of the invention is given by the appended claims, rather than the preceding description, and all variations and equivalents which fall within the range of the claims are intended to be embraced therein.

In the booting system and booting method described above the POST is performed very quickly and does not include unnecessary hardware resources such as a ROM BIOS, which take up additional space. Further, it is advantageous in that updating the embedded OS running the POST sequence is easily done by updating the embedded OS through an interface such as IDE.

Embodiments of the present invention may also be implemented in a general-purpose computer by implementing computer readable code/instructions from a medium, e.g., a computer-readable medium, including but not limited to storage media such as magnetic storage media (ROMs, RAMs, floppy disks, magnetic tapes, etc.), optically readable media (CD-ROMs, DVDs, etc.), and carrier waves (e.g., transmission over the Internet). The present invention may also be embodied as a medium having a computer-readable code embodied therein for causing a number of computer systems connected via a network to effect distributed processing. And the functional programs, codes and code segments for embodying the present invention may be easily deducted by programmers in the art which the present invention belongs to.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A computing system comprising a booting system, comprising:

an auxiliary memory medium, including execution codes of an embedded OS in a predetermined area thereof, separate from any BIOS memory of a corresponding computing system;
   a CPU for extracting and executing the codes for the computing system's initial booting; and
   a plurality of peripherals that can self-initialize in parallel in response to an instruction received from the embedded OS run by executing the codes.

2. The computing system of claim 1, wherein the auxiliary memory medium is a hard disc.

3. The computing system of claim 1, wherein the predetermined area includes a non-volatile memory.

4. The computing system of claim 3, wherein the non-volatile memory is a flash memory.

5. The computing system of claim 1, wherein the peripherals receive initialization instructions from the embedded OS, self-initialize themselves using their own initializing programs stored in the auxiliary memory medium based on the initialization instructions, and transmit information containing initialization results to the embedded OS.

6. A booting method for a computing system, comprising:
   extracting codes to execute an embedded OS stored in a medium separate from any BIOS memory of the computing system;
   executing the extracted codes for the computing system's initial booting; and
   initializing a plurality of peripherals in parallel by the embedded OS executed by the extracted codes.

7. The booting method of claim 6, wherein embedded OS is stored in a predetermined area of an auxiliary memory medium.

8. The booting method of claim 7, wherein the auxiliary memory medium is a hard disc.

9. The booting method of claim 7, wherein the predetermined area includes a non-volatile memory.

10. The booting system of claim 9, wherein the non-volatile memory is a flash memory.

11. The booting method of claim 7, wherein the initializing comprises:
    broadcasting initialization instructions to a peripheral by the embedded OS;
    allowing the peripheral to self-initialize itself using it's own initialization programs stored in the auxiliary memory medium; and
    delivering information containing the initialization results to the embedded OS.

12. The booting method of claim 6, further comprising:
    storing the initialization results in an additional data structure.

13. The booting method of claim 12, wherein the additional data structure is a table structure.

14. The booting method of claim 6, further comprising:
    outputting a warning message to a user if the initialization of the peripherals fail.

15. The booting method of claim 14, wherein the warning message is in a text format.

16. The booting method of claim 14, wherein the warning message is a sound.

17. A booting method for initializing a peripheral device, comprising:
    receiving an initialization instruction;
    performing self-initializing and/or testing; and
    delivering information containing the initializing and/or testing result to an embedded OS, for booting a computing system, stored in a medium separate from any BIOS memory of the computing system.

18. The booting method of claim 17, further comprising: transmitting a peripheral identification code to the embedded OS.

19. A booting method for initializing peripheral devices for a computing system, comprising:
broadcasting an initialization instruction to a peripheral device from an embedded OS for booting the computing system; and
receiving in the embedded OS the initialization and/or test result of the peripheral device.

20. The booting method of claim 19, further comprising: analyzing the result of the peripheral devices.

21. An auxiliary memory medium for a computing system, comprising:
execution codes of an embedded OS, in a predetermined area thereof separate from any BIOS memory of the computing system, to boot the computing system though extraction and execution of the codes for the computing system's initial booting.

22. The auxiliary memory medium of claim 21, wherein execution codes of a plurality of peripherals can self-initialize in parallel in response to an instruction received from the embedded OS run by executing the codes.

* * * * *